Oct. 4, 1955  J. C. SALMONS  2,719,709
MINING MACHINE WITH RETRACTIBLE DEFLECTOR PLATES
Filed Feb. 3, 1954  5 Sheets-Sheet 1

INVENTOR.
Jerome C. Salmons
BY
Murray G. Gleeson
ATTORNEY

INVENTOR.
Jerome C. Salmons
BY
Murray A. Greeson
ATTORNEY

INVENTOR.
Jerome C. Salmons

Oct. 4, 1955 J. C. SALMONS 2,719,709
MINING MACHINE WITH RETRACTIBLE DEFLECTOR PLATES
Filed Feb. 3, 1954 5 Sheets-Sheet 4

INVENTOR.
Jerome C. Salmons
BY
Murray A. Gleeson
ATTORNEY

United States Patent Office 2,719,709
Patented Oct. 4, 1955

2,719,709

MINING MACHINE WITH RETRACTIBLE DEFLECTOR PLATES

Jerome C. Salmons, Chicago, Ill., assignor to Goodman Manufacturing Company, Chicago, Ill., a corporation of Illinois Application February 3, 1954, Serial No. 408,003

4 Claims. (Cl. 262—9)

This invention relates to improvements in multiple boring machines of the kind commonly known as McKinlay type machines wherein two radial boring members are rotatable on parallel spaced axes to cut contiguous overlapping bores in advance of the machine, and an auxiliary cutter chain is guided horizontally by cutter bars immediately behind the boring members to cut off the upstanding and depending cusps left at the floor and roof, respectively, between the two main bores. The cutter bars are usually extensible or retractible vertically by power to facilitate withdrawal of the machine from the working face, and means are also provided for inward swinging retraction of the cutter chain idler sprockets at opposite ends of the two cutter bars. A machine of the general type above described is shown in the copending applications of James S. Robbins, bearing Ser. No. 345,157 and Ser. No. 381,378, owned by the assignee of the present invention.

The principal object of the present invention is to provide an improved form and arrangement of deflector plates carried with the inwardly swinging cutter chain idler sprockets at opposite ends of the lower cutter bar, so as to aid in guiding material fragmented by the boring members and cutter chains toward the pickup conveyor at the center of the machine during cutting, but which deflector plates are automatically retractible with the idler sprockets when the latter are swung inwardly into retracted position.

Other objects of the invention will appear from time to time as the following description proceeds.

The invention may best be understood by reference to the accompanying drawings, in which.

Figure 1:
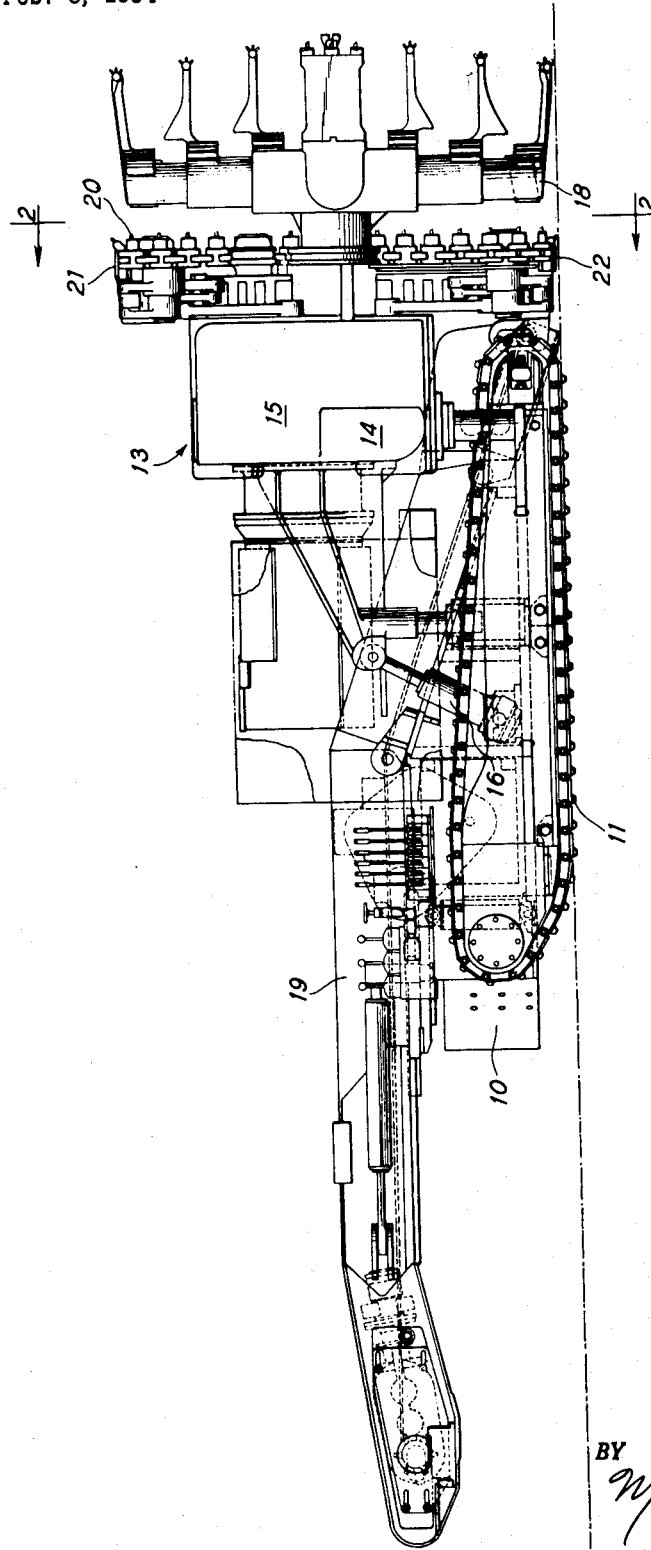
Figure 1 is a side view of a multiple boring machine to which the present invention is applied.
Figure 2:
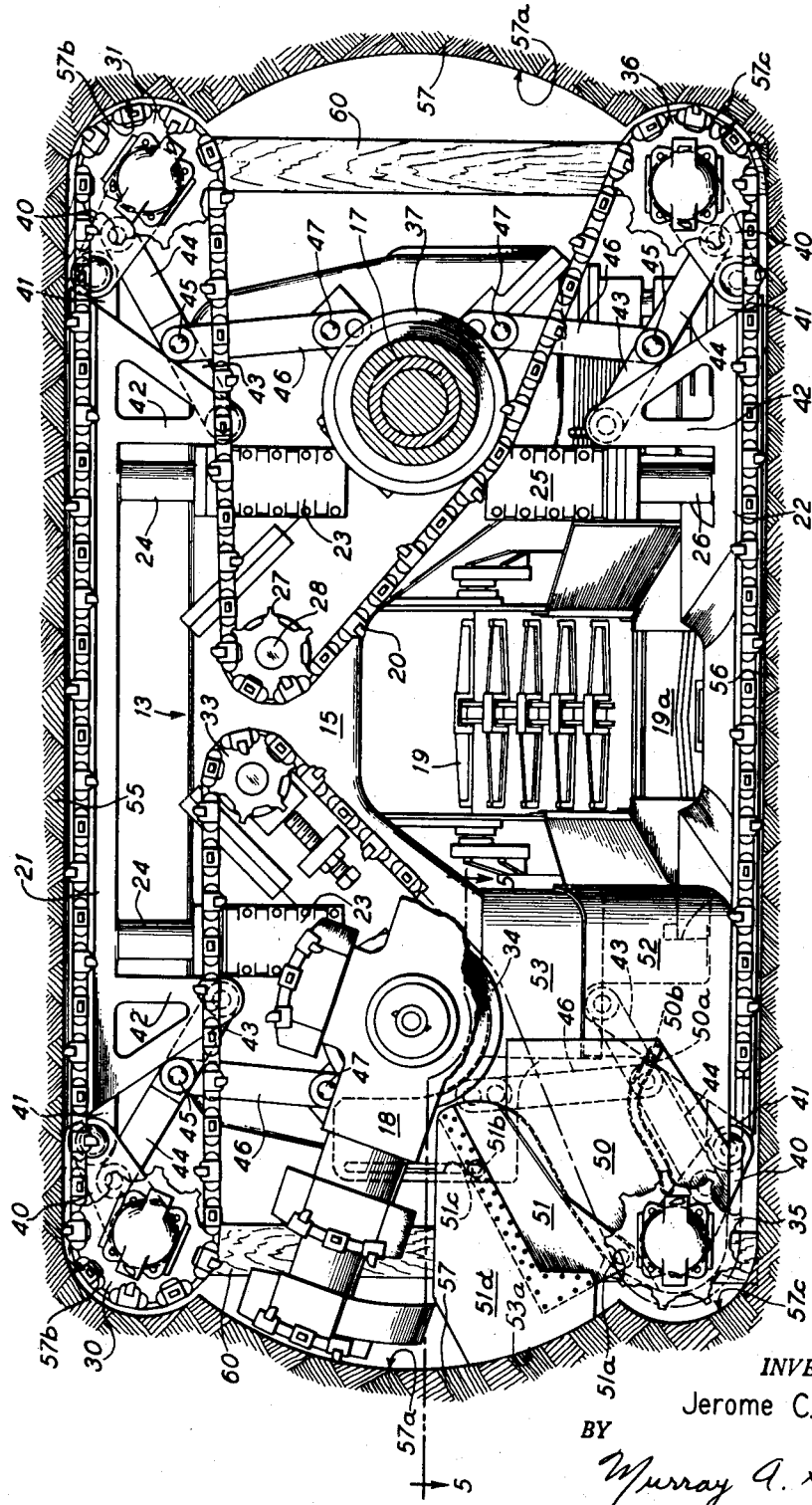
Figure 2 is an enlarged detail section taken generally on line 2—2 of Figure 1, showing the upper and lower cutter bars, end sprockets and movable deflector plates disposed in fully extended normal cutting position, and with certain parts broken away.
Figure 3:
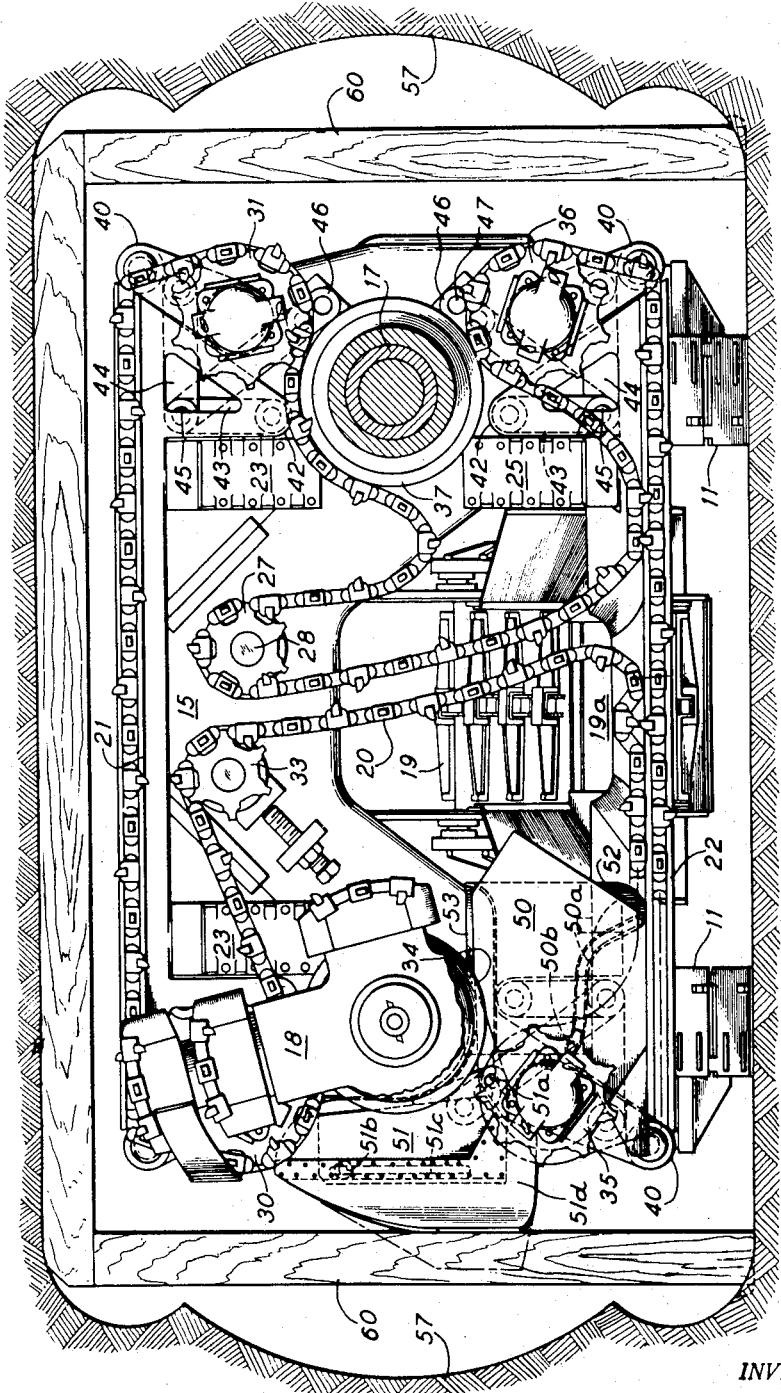
Figure 3 is a view similar to Figure 2, but showing the cutter bars, end sprockets and movable deflector plates in fully retracted positions.

Referring to details of the embodiment of the invention shown in the drawings, Figure 1 shows a mining machine of the type which bores a pair of overlapping contiguous bores in a seam of coal or the like, and includes a main frame 10 mounted on crawler treads 11 for propelling the machine along the mine floor. An auxiliary frame 13 is mounted on the front end of the main frame and is arranged to be raised or lowered as usual by a pair of jacks 14 on opposite sides of a gear casing 15. The auxiliary frame 13 may also be tilted forwardly or rearwardly by a pair of jacks 16. The gear casing 15 has extending forwardly therefrom a pair of laterally spaced power driven shafts 17 which support boring members 18 arranged to rotate in timed relation to each other. A part of one of the boring members 18 is shown in Figures 2 and 3. These boring members cut arcuate ribs 57a at opposite sides of the composite bore formed by the machine.

The main frame 10 has a longitudinally extending chain flight conveyor 19 as usual for conducting fragmented material from the working face through a throat 19a to the rear of the machine. The general arrangement of parts previously described are substantially as described in the copending application of James S. Robbins, Ser. No. 345,157 so need not be more fully described herein, excepting as to features which form parts of the present invention.

An endless cutter chain 20 is trained as usual along the front of upper and lower cutter bars 21 and 22 in position to remove the upper and lower cusps left by the normal cutting action of the two boring members. A pair of laterally spaced hydraulic cylinders 23 are fixed on the auxiliary frame, having piston rods 24 fixed to opposite ends of the upper cutter bar 21 for adjusting the latter vertically. A similar pair of hydraulic cylinders 25 with piston rods 26 are provided for adjusting the lower cutter bar 22 vertically.

Figure 4:
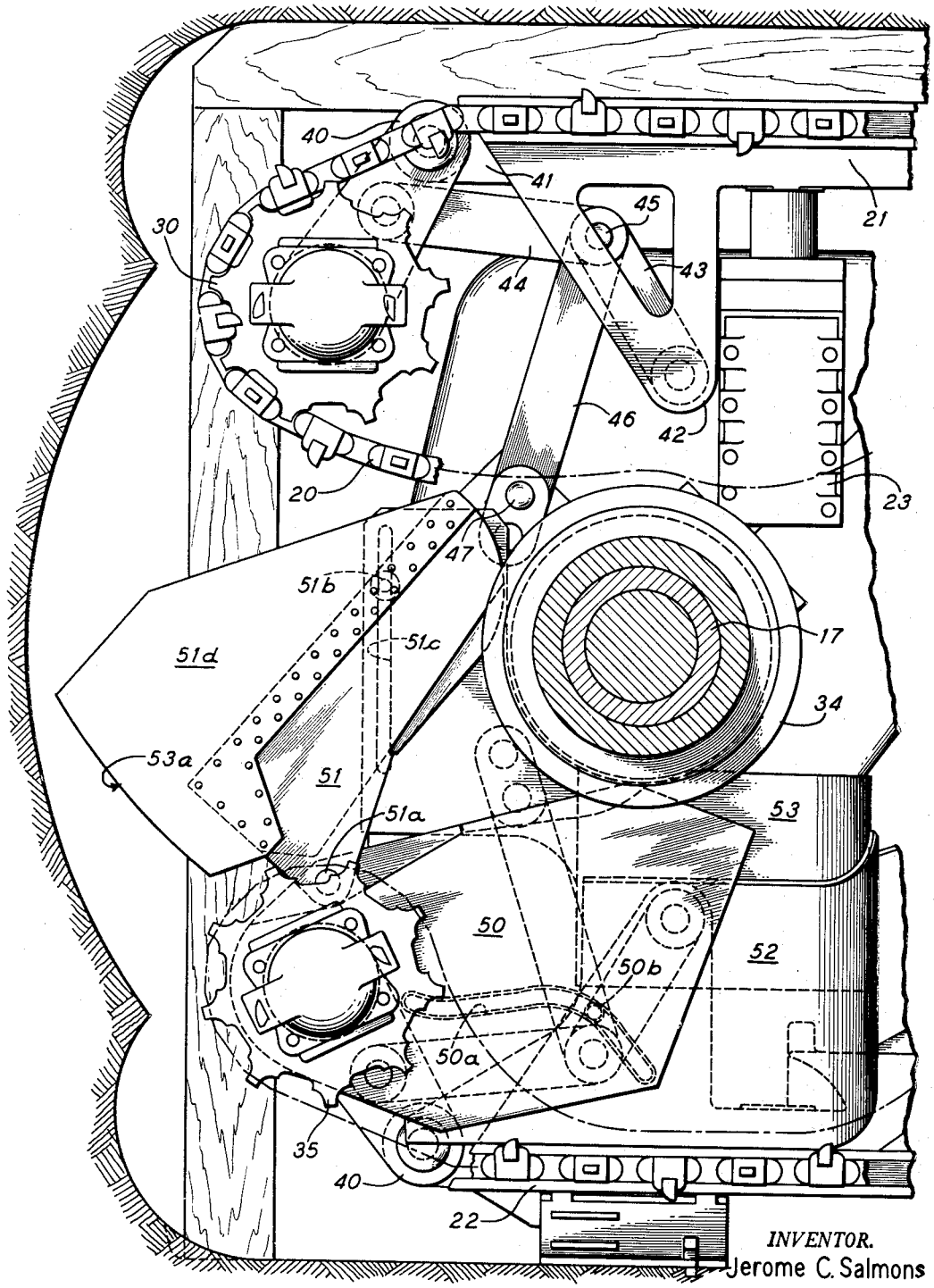
Figure 4 is a view similar to Figures 2 and 3, but showing the cutter bars, end sprockets and deflector plates in an intermediate position.

The cutter chain 20 is suitably driven by a sprocket 27 on shaft 28 extending from the front of gear casing 15. Said cutter chain is guided over idler sprockets 30 and 31 at the left and right ends respectively of the upper cutter bar, to cut arcuate corner patterns 57b, 57b as seen in Figures 2, 3 and 4. From the left idler sprocket the cutter chain is trained over a tensioning idler 33, thence over a guide roller 34 on the gear housing, and thence over an idler sprocket 35 at the left end of lower cutter bar 22. After being guided as usual along the lower cutter bar, the chain is trained over an idler sprocket 36 at the right end of the lower cutter bar, thence over a guide roller 37 similar to the previously mentioned roller 34, and thence to the drive sprocket 27. The idler sprockets 35 and 36 cause the chain to cut arcuate corner patterns 57c, 57c.

Suitable linkage means is provided for hinging the end idler sprockets 35 and 36 relative to the ends of the lower cutter bar 22 so as to swing said sprockets upwardly and inwardly when said cutter bar is raised out of its normal cutting position at the floor. Such linkage means may vary, the form of linkage shown herein for the purpose of illustration of the present invention being similar to that described in a copending application of James S. Robbins and Carl Wilms, bearing Ser. No. 410,348, owned by the assignee of the present invention. In this form of linkage, sprockets 35 and 36 are each journalled on the outer end of a swinging link 40 pivoted at its inner end to an extension 41 at the extreme end of cutter bar 22. When said sprockets are in fully extended normal cutting position as shown in Figure 2, each swinging link 40 extends at an upwardly and outwardly inclined angle to the cutter bar, so that the bottom of the sprocket is in horizontal alignment with the cutter chain as it passes along the cutter bar.

The cutter bar 22 also has upright brackets 42 spaced inwardly from each end thereof. Each swinging link 40 is connected to the upper end of the adjacent bracket by two links 43 and 44, pivotally connected at adjacent ends by pivot pin 45. In the form shown link 44 has bifurcated inner end portions 44a and 44b between which link 43 is pivoted. The outer link 44 is pivotally connected to the swinging link 40 intermediate the ends of the latter. The link 40 as herein shown includes inner and outer cheeks 41a and 41b between which link 44 is pivoted.

A generally upright link 46 is pivotally connected at its upper end to a pin 47 mounted on the gear casing 15. The lower end of said upright link has common pivotal connection on pivot pin 45 with links 43 and 44. The arrangement is such that when the cutter bar is in lowered, normal cutting position at floor level as seen in Figure 2, the sprockets 35 and 36 are in fully extended cutting position, but when the cutter bar is raised as in Figure 3, the sprockets are swung upwardly and inwardly in retracted position relative to the cutter bar as well as the machine as a whole.

Referring now more particularly to the movable deflector means which forms the principal part of the present invention, each idler sprocket 35 and 36 at opposite ends of the lower cutter bar has two deflector plates 50 and 51 mounted for movement therewith, in addition to a pusher plate 52 which is secured to and movable with lower cutter bar 22.

Figure 5:
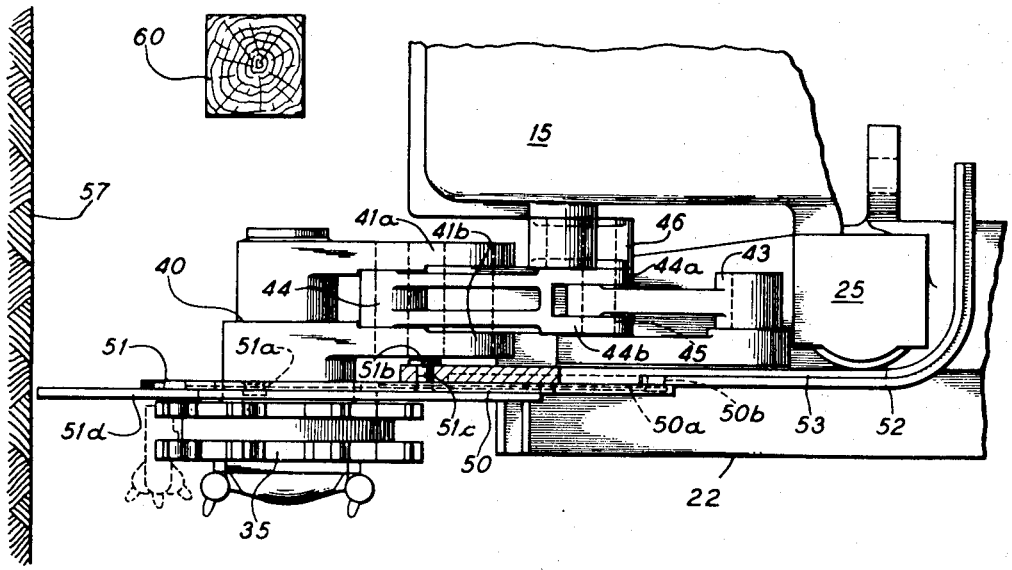
Figure 5 is a detail section taken generally on line 5—5 of Figure 2.

As shown in Fig. 5, each deflector plate 50 is swivelled at its outer end on swing link 40 (about the axis of the sprocket) immediately to the rear of its sprocket and has a T-cross-section slot 50a extending along its rear face for engagement by the head of a pin 50b fixed on the movable pusher plate 52 in overlapping relation with a fixed pusher plate 53 on the machine frame at one side of the conveyor throat 19a.

In the preferred form shown herein, the slot 50a is formed on a sinuous curve as shown so as to maintain the deflector plate 50 generally horizontal while the sprocket link 40 is being swung to its various positions. For instance, when the sprocket link is in fully retracted position as seen in Fig. 3, the pin 50b is at its highest position coincident with the outer end of the curved slot. The slot is curved downwardly at its said outer end, in a relatively slight degree. As the cutter bar moves from the Fig. 3 position toward a more extended position, the parts pass through an intermediate position shown in Fig. 4 in which the pin 50b coincides with an "elbow" in the slot, beyond which the curvature increases as the parts extend to the fully extended position of Fig. 2. The specific curvature of slot 50a may be any configuration, including the example shown, which will permit the plate 50 to clear the hub mounting for guide roller 37 or 34 in the fully retracted position of Fig. 3 and yet permit the plate 50 to completely overlap the edges of the plate 52 in the fully extended position of Fig. 2.

The second movable deflector plate 51 which is movable with the sprocket has one corner pivotally connected by pivot pin 51a to the upper outer corner of its associated plate 50, and has a guide pin 51b adjacent its opposite end slidable in an upright slot 51c formed in the fixed pusher plate 53. An L-shaped outer and upper portion 51d of plate 51 is preferably made of a semipliable rubber sheet, such as a piece of rubber conveyor belting, so as to be normally held in the same place as the main body of said plate, but to be sufficiently flexible as to bend to provide maximum lateral clearance, as for instance to pass by an upright mine prop 60 when fully retracted as indicated in Fig. 3.

The outer edge 53a of the rubber sheet is of generally arcuate shape to correspond with the curved side wall 57 of the bore when the plates 50 and 51 are in lowered positions for normal cutting as shown in Fig. 2.

It will now be understood from the above description that the two deflector plates 50 and 51 at each side of the machine are extended with the end idler sprockets when the latter are in normal cutting position, so as to keep the cuttings, which are deposited on the mine floor by the boring members and cutter bars, from spreading rearwardly along opposite sides of the bore, but instead, keep the cuttings in position to be swept inwardly by the boring members toward the open throat 19a of the conveyor 19 for removal to the rear of the machine. When the lower cutter bar is raised and the end sprocket retracted, the plates 50 and 51 are automatically moved into retracted position so as not to interfere with the withdrawal of the cutting devices from the bore, as shown in Figure 3, wherein the two plates have been swung away from each other about point 51a, the lower plate 50 being guided for horizontal movement relative to the lower cutter bar, and the upper plate being guided to assume an upright position along the side of the machine.

Although I have shown and described certain embodiments of my invention, it will be understood that I do not wish to be limited to the exact construction shown and described but that various changes and modifications may be made without departing from the spirit and scope of the invention as defined in the appended claims.

I claim:

1. In a multiple boring machine having a frame, a pair of laterally spaced boring members rotatable on parallel axes for cutting contiguous overlapping bores in advance of the machine, a conveyor supported by said main frame including a gathering end for conveying cuttings away from a working face, a horizontally disposed cutter bar rearwardly of said boring members and adjustable vertically of said frame between a floor level approximately tangential to the normal cutting diameters of said boring members to positions substantially above said floor level, upright pusher plates fixed along said cutter bar at opposite sides of the gathering end of said conveyor, a cutter chain trained along said cutter bar, idler end sprockets journalled on the outer ends of links which have their inner ends pivotally connected to the opposite ends of said cutter bar for inward and upward hinged movement of said sprockets relative to said cutter bar, the improvement which consists in an upright deflector plate pivotally mounted coaxially with and to the rear of each of said sprockets, with the inner end of said plate overlapping the adjacent pusher plate on the cutter bar, guide means for maintaining the inner end of said deflector plate in a generally horizontal overlapping relation to said pusher plate in the various positions of swinging movement of the adjacent sprocket, a second elongated deflector plate pivotally connected adjacent its outer end to the upper edge of said first deflector plate, and having its lower edge lapping the upper edge of the latter when said sprocket is in lowered position, and guide means cooperating between the machine frame and the second deflector plate for pivotally swinging the inner end of the later upwardly and away from said first deflected plate into a generally upright position when the said sprocket is in raised position.

2. The structure in accordance with claim 1, wherein the guide means for the first deflector plate consists of a pin mounted on the face of the adjacent pusher plate having slotted engagement in said first deflector plate, to maintain the latter in a generally horizontal position in the various positions of the sprocket.

3. The structure in accordance with claim 1, wherein the guide means for the second deflector plate consists of a pin on the swinging end of said plate having slotted engagement in a generally vertical guide on the main frame.

4. The structure in accordance with claim 1, wherein the second deflector plate includes a flexible portion along the edge which projects laterally of the machine when the second deflector plate is swung into its generally upright position.

No references cited.